US011199961B2

(12) United States Patent
Rivera et al.

(10) Patent No.: US 11,199,961 B2
(45) Date of Patent: *Dec. 14, 2021

(54) WIRELESS DEVICE HAVING A REAR PANEL CONTROL TO PROVIDE ADVANCED TOUCH SCREEN CONTROL

(71) Applicant: TracFone Wireless, Inc., Miami, FL (US)

(72) Inventors: Sergio Rivera, Miami, FL (US); Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,677

(22) Filed: Jan. 12, 2021

(65) Prior Publication Data

US 2021/0132763 A1    May 6, 2021

Related U.S. Application Data

(63) Continuation of application No. 16/701,579, filed on Dec. 3, 2019, now Pat. No. 10,891,046, which is a continuation of application No. 15/625,093, filed on Jun. 16, 2017, now Pat. No. 10,496,270.

(60) Provisional application No. 62/350,972, filed on Jun. 16, 2016.

(51) Int. Cl.
*G06F 1/16* (2006.01)
*G06F 3/0488* (2013.01)
*G06F 3/0482* (2013.01)
*H04M 1/23* (2006.01)

(52) U.S. Cl.
CPC .......... *G06F 3/0488* (2013.01); *G06F 1/1692* (2013.01); *G06F 3/0482* (2013.01); *H04M 1/236* (2013.01); *H04M 2250/22* (2013.01)

(58) Field of Classification Search
CPC .... G06F 3/0488; G06F 3/0482; G06F 1/1692; H04M 1/236; H04M 2250/22
See application file for complete search history.

(56) References Cited

U.S. PATENT DOCUMENTS

| 2014/0078086 A1 | 3/2014 | Bledsoe et al. |
| 2016/0188181 A1 | 6/2016 | Smith |
| 2016/0306524 A1 | 10/2016 | Park et al. |

*Primary Examiner* — Rinna Yi
(74) *Attorney, Agent, or Firm* — BakerHostetler

(57) ABSTRACT

An electronic device including a housing including a front panel and a rear panel, the rear panel arranged on a side of the housing opposite the front panel, a processor configured to execute instructions and the processor being arranged within the housing, a display device configured to generate an interface based in part in response to the processor, where the display device is arranged in the front panel, a touchscreen associated with the display device and configured to sense a user input, where the user input is provided to the processor and where the touchscreen include part of the front panel, and a rear input arranged on the rear panel of the housing and configured to provide a dedicated input to the processor, the processor providing advanced user controls on the interface in response to operation of the rear input.

20 Claims, 10 Drawing Sheets

WIRELESS DEVICE HAVING A REAR PANEL CONTROL TO PROVIDE ADVANCED TOUCH SCREEN CONTROL

CROSS REFERENCE TO PRIOR APPLICATIONS

This application is a continuation of U.S. patent application Ser. No. 16/701,579, filed Dec. 3, 2019, now U.S. Pat. No. 10,891,046 issued Jan. 12, 2021, which is incorporated herein by reference in its entirety; which application is a continuation of U.S. patent application Ser. No. 15/625,093, filed Jun. 16, 2017, now U.S. Pat. No. 10,496,270 issued Dec. 3, 2019, which is incorporated herein by reference in its entirety; and which application claims the benefit from U.S. Provisional Application No. 62/350,972 filed on Jun. 16, 2016, which is hereby incorporated by reference in its entirety for all purposes as if fully set forth herein.

BACKGROUND OF THE DISCLOSURE

1. Field of the Disclosure

This disclosure relates generally to a wireless device and process having a rear panel control to provide advanced touch screen control.

2. Related Art

Many electronic devices have touch-based graphical user interfaces. These electronic devices can include wireless devices, mobile phones, tablet computers, gaming devices, MP3 players, and the like. These electronic devices have the touch-based graphical user interface arranged on the front panel. A basic touch-based graphical user interface typically does not have the ability to provide multiple functions based on a single touch. Touching the touch-based graphical user interface will typically result in the opening of an application, executing an application, launching an application, opening a particular selected content, and the like. For more advanced control, the user will have to navigate multiple screens and/or multiple application windows. There have been some attempts to correlate the type of touch to a particular desired result. However, these attempts are expensive, complex, and difficult to manufacture. Moreover, these prior art attempts to correlate the type of touch to obtain the desired result are often difficult for users to utilize as users must initiate the appropriate touch to result in the desired functionality. Often users will provide the wrong type of touch resulting in an undesired action.

Accordingly, there is a need for a wireless device and process that provides a user with the ability to provide advanced input, execution and other interaction with the wireless device by a user that is less expensive, less complex, easier to manufacture, and less difficult for a user to utilize.

SUMMARY OF THE DISCLOSURE

The foregoing needs are met, to a great extent, by the disclosure, with a process and device for implementing a wireless device and process to provide a control input arranged on the rear panel of the wireless device to provide advanced touch screen control.

In one or more aspects, an electronic device includes a housing including a front panel and a rear panel, the rear panel arranged on a side of the housing opposite the front panel, the housing further including side edges connecting the rear panel to the front panel, a processor configured to execute instructions and the processor being arranged within the housing, a display device configured to generate an interface based in part in response to the processor, wherein the display device is arranged in the front panel, a touchscreen associated with the display device and configured to sense a user input, wherein the user input is provided to the processor and wherein the touchscreen includes part of the front panel, and a rear input arranged on the rear panel of the housing and configured to provide a dedicated input to the processor, the processor providing advanced user controls on the interface in response to operation of the rear input, where the advanced user controls include at least one of the following: a user menu functionality, a content peek functionality, a pop functionality, and a trackpad functionality.

In a further aspect, a process of implementing an electronic device includes providing a housing including a front panel and a rear panel, the rear panel arranged on a side of the housing opposite the front panel, the housing further including side edges connecting the rear panel to the front panel, arranging a processor within the housing, the processor configured to execute instructions, arranging a display device in the front panel, the display device configured to generate an interface based in part in response to the processor, arranging a touchscreen as part of the front panel, the touchscreen associated with the display device and configured to sense a user input, wherein the user input is provided to the processor, and arranging a rear input on the rear panel of the housing, the rear input configured to provide a dedicated input to the processor, the processor providing advanced user controls on the interface in response to operation of the rear input, where the advanced user controls include at least one of the following: a user menu functionality, a content peek functionality, a pop functionality, and a trackpad functionality.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
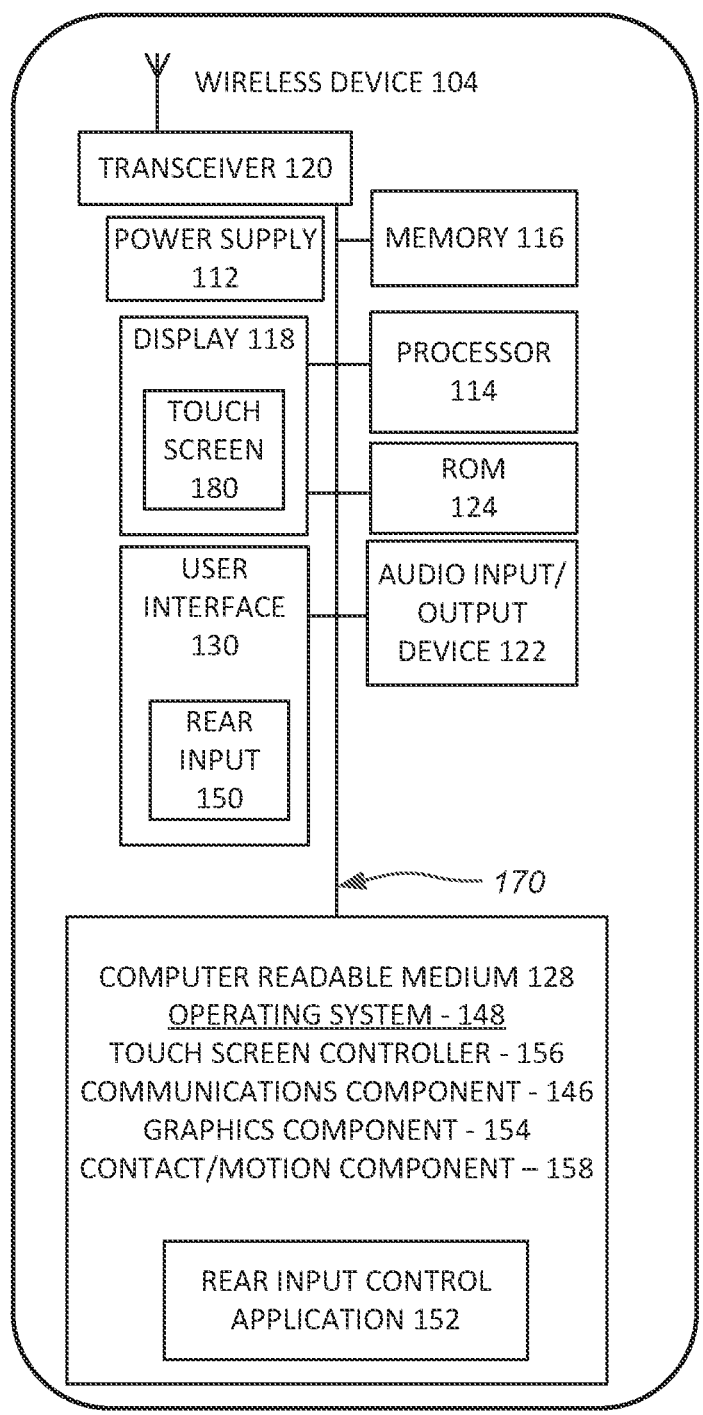
FIG. 1 shows the details of an exemplary wireless device in accordance with aspects of the disclosure.

Reference in this specification to a wireless device is intended to encompass devices such as smartphones, mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Wireless devices may connect to a "wireless network" or "network" and are intended to encompass any type of wireless network to obtain mobile phone services through the use of a wireless device, such as the Global System for Mobile Communication (GSM) network, Code-Division Multiple Access (CDMA) network GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, a communication channel as defined herein, or the like, and/or a combination of two or more thereof, that may utilize the teachings of the disclosure to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Currently manufacturers rely on advanced and/or expensive touchscreen hardware to enable features such as Apple's 3D Touch. However, such features have a high cost and high complexity. The disclosure contemplates use of a rear panel button or panel along with software logic that allows a device to replicate the equivalent of PC right-click functionality, Apple 3D Touch and/or the like. The disclosure includes numerous envisioned applications for such a solution but at its most simple a user could click or click and hold a button which would enable advanced touchscreen control or a "Smart Touch" mode and whatever the user clicks on next on a front screen would result in a right-click reaction or other action as set forth herein. This functionality and implementation (button versus panel) may cover numerous other areas and applications. For example, in one aspect a rear panel that acts like a trackpad thus providing gestures and considerable functionality to the user.

FIG. 1 shows the details of an exemplary wireless device in accordance with aspects of the disclosure. The wireless device 104 includes a processor 114, a memory 116, a display 118, a user interface 130, and the like. The processor 114 may be a central processing unit, microprocessor, dedicated hardware, or the like configured to execute instructions including instructions related to software programs. The display 118 may be a liquid crystal display having a backlight to illuminate the various color liquid crystals to provide a colorful display. The user interface 130 may be any type of physical input having one or more buttons, switches, and the like and/or may be implemented as a touchscreen 180.

The wireless device 104 may further include in the memory 116 or separate from the memory 116, a computer readable memory 128, an operating system 148, a communication component 146, a contact/motion component 158, a touchscreen controller 156, a graphics component 154 and the like. The operating system 148 together with the various components providing software functionality for each of the components of the wireless device 104. The wireless device 104 may further include a read-only memory 124 (ROM) and a power supply 112 such as a battery.

The memory 116 may include a high-speed random-access memory. Also, the memory 116 may be a non-volatile memory, such as magnetic fixed disk storage, flash memory or the like. The various components of the wireless device 104 may be connected through various communication lines including a data bus 170.

Additionally, the wireless device 104 may include an audio input/output device 122. The audio input/output device 122 may include speakers, speaker outputs, and in the like, providing sound output; and may include microphones, microphone inputs, and the like, for receiving sound inputs. The audio input/output device 122 may include an analog to digital converter and a digital to audio converter for audio input and output functions respectively.

When implemented as a smart phone, the wireless device 104 may include a transceiver 120 and the like. The wireless device 104 may provide radio and signal processing as needed to access a network for services over a communication channel as defined herein. The processor 114 may be configured to process call functions, data transfer, and the like and provide other services to the user. The transceiver 120 may also include a receiver configured to provide location based on a global navigation satellite system (GNSS). The receiver configured to provide location based on a global navigation satellite system (GNSS) may also be implemented in a separate component.

The touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus.

In operation, the display 118 may display various objects associated with applications for execution by the processor 114. In this regard, a user may touch the display 118, and in particular the touchscreen 180, to interact with the objects. For example, touching an object may execute an application in the processor 114 associated with the object that is stored in memory 116. The display 118 may include a plurality of the objects for the user to interact with. The display 118 may include a plurality of the contents for the user to interact with. Moreover, the display 118 may include a plurality of screens. The display 118 showing one screen at a time. The user may interact with the display 118 to move a screen into or out of view on the display 118. Various objects and content may be located in the each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The wireless device may include a rear input 150. The rear input 150 may be a button, a switch, a touch sensitive area, or the like. In one aspect the rear input may be a button. In one aspect the rear input may be a button that is recessed into the rear panel 302 to limit inadvertent pressing. In one aspect, the rear input 150 may operate in conjunction with a rear input control application 152. In one aspect, the rear input 150 may operate in conjunction with the user interface 130. In one aspect, the rear input 150 may be implemented as a button that is responsive to a single click, a double-click, a triple click, an extended hold or pressing, a soft touch, a hard touch, and/or the like. In one aspect, the soft touch and hard touch functionality being implemented by a pressure sensitive implementation of the rear input 150. Accordingly, the soft touch input to the rear input 150 being where a user applies a first level of pressure to the rear input 150; and the hard touch input to the rear input 150 being where a user applies a second level of pressure to the rear input 150 that is greater than the first level of pressure. In other words, the soft touch and hard touch functionality of the rear input 150 are distinguished by the amount of pressure a user applies to the rear input 150. In one aspect, the soft touch and hard touch functionality being implemented by an actuation amount implementation of the rear input 150. Accordingly, the soft touch input to the rear input 150 being where a user applies a first level of actuation amount to the rear input 150; and the hard touch input to the rear input 150 being where a user applies a second level of actuation amount to the rear input 150 that is greater than the first level of pressure. In other words, the soft touch and hard touch functionality of the rear input 150 are distinguished by the amount of actuation a user applies to the rear input 150. For example, a partial actuation of the rear input 150 may be considered a soft touch; and a full actuation of the rear input 150 may be considered a hard touch. In one aspect, the rear input 150 may be associated with the rear input control application 152 to provide advanced touchscreen control as described in further detail below.

Figure 2:
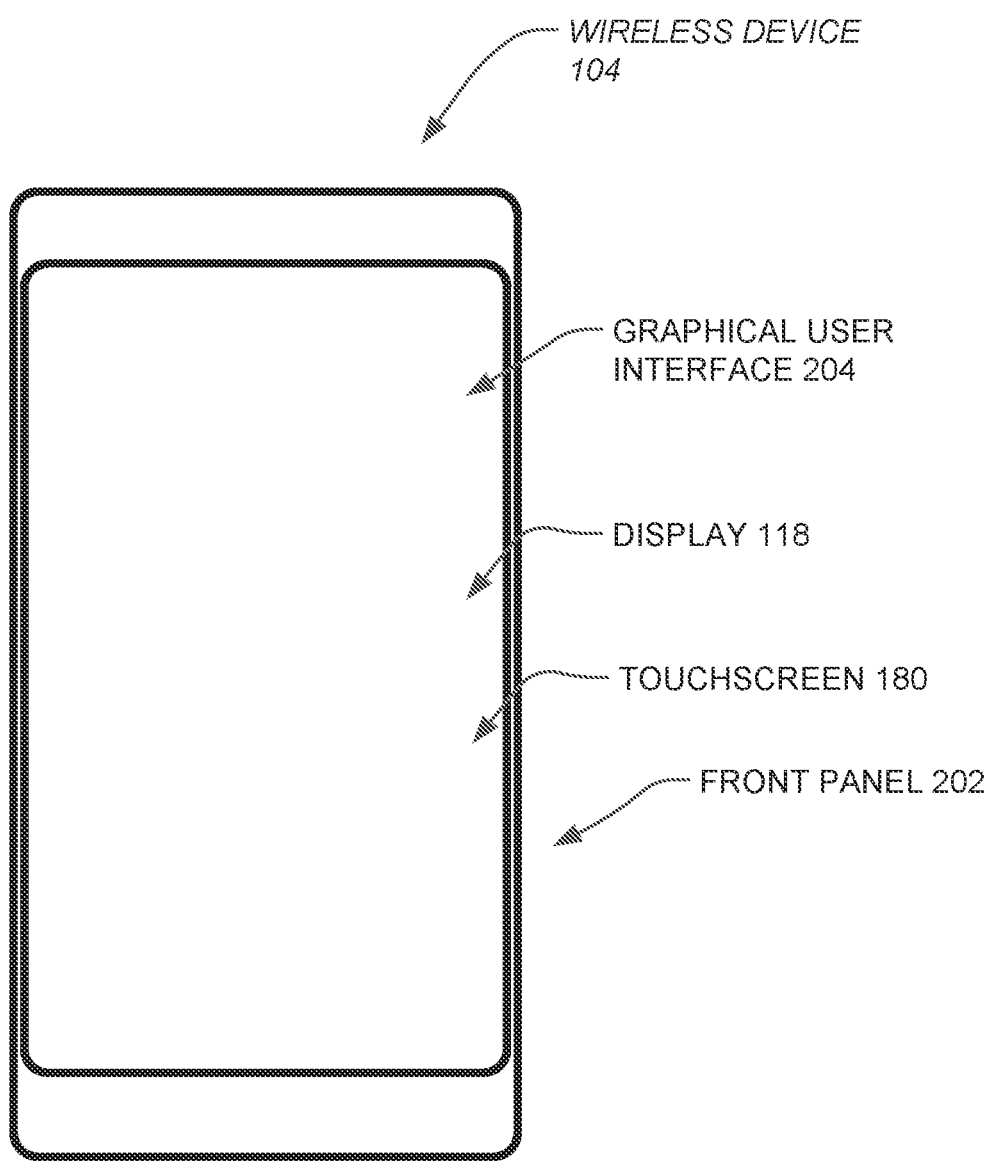
FIG. 2 shows a front panel of the wireless device in accordance with aspects of the disclosure.

FIG. 2 shows a front panel of the wireless device in accordance with aspects of the disclosure. In particular, FIG. 2 shows a front panel 202 of the wireless device 104. The front panel 202 may include the display 118 and a graphical user interface 204 that may implement the touchscreen 180. The front panel 202 may further include a camera device and a lens (not shown). In one aspect, the front panel 202 may be a generally flat surface.

Figure 3:
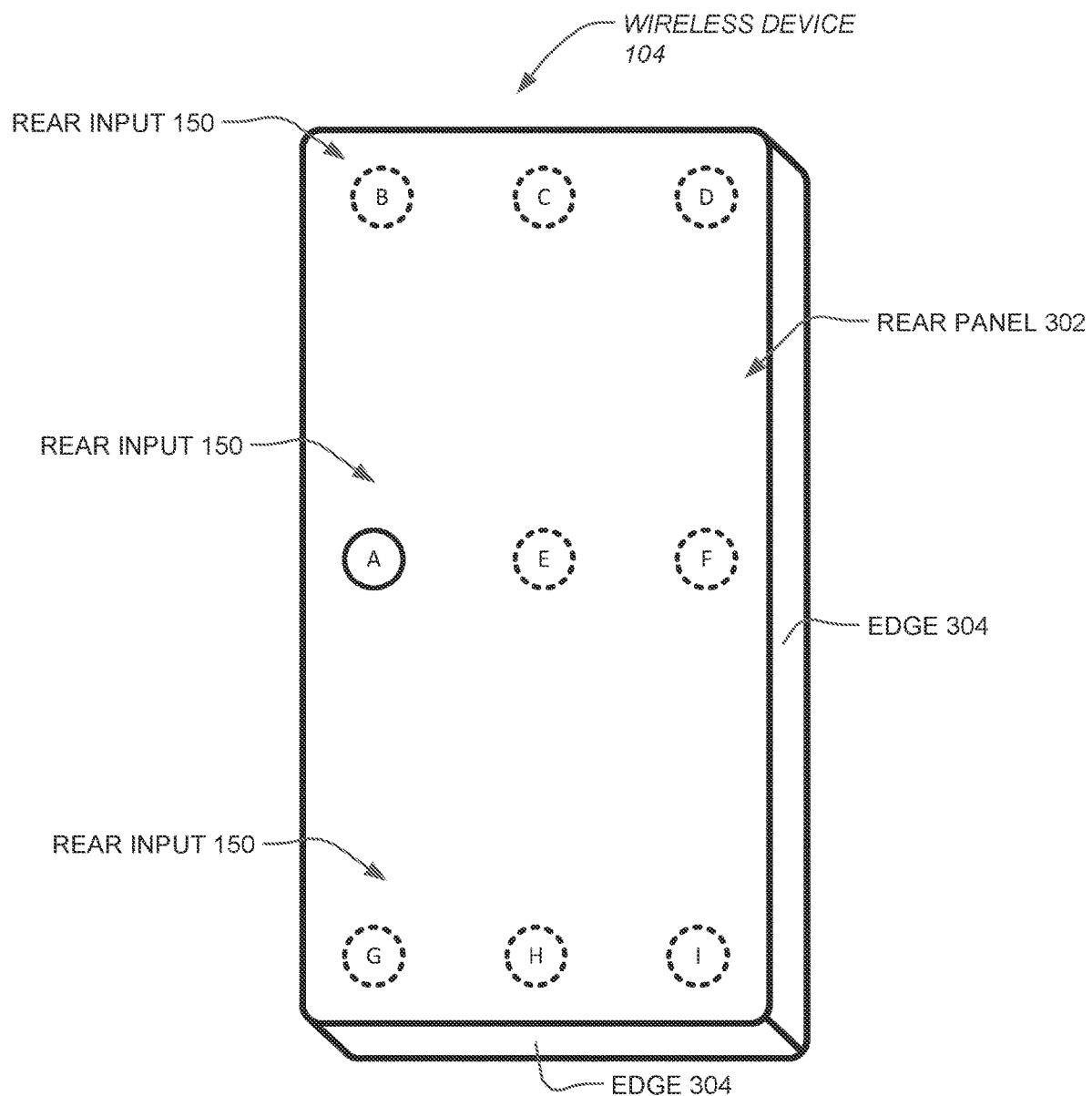
FIG. 3 shows a rear panel of the wireless device in accordance with aspects of the disclosure.

FIG. 3 shows a rear panel of the wireless device in accordance with aspects of the disclosure. In particular, FIG. 3 shows the rear panel 302 of the wireless device 104. In one aspect the rear panel 302 may be a generally flat surface. In one aspect the front panel 202, the rear panel 302, and edges 304 of the wireless device 104 form a housing. The edges 304 extending between the front panel 202 and the rear panel 302. Arranged on the rear panel 302 may be the rear input 150. In one aspect, the rear input 150 may be positioned on the left central side of the rear panel 302 as indicated by reference A. In one aspect, the rear input 150 may be positioned on the left upper side of the rear panel 302 as indicated by reference B. In one aspect, the rear input 150 may be positioned on the upper center side of the rear panel 302 as indicated by reference C. In one aspect, the rear input 150 may be positioned on the right upper side of the rear panel 302 as indicated by reference D. In one aspect, the rear input 150 may be positioned on the center of the rear panel 302 as indicated by reference E. In one aspect, the rear input 150 may be positioned on the right central side of the rear panel 302 as indicated by reference F. In one aspect, the rear input 150 may be positioned on the left lower side of the rear panel 302 as indicated by reference G. In one aspect, the rear input 150 may be positioned on the center lower side of the rear panel 302 as indicated by reference H. In one aspect, the rear input 150 may be positioned on the right lower side of the rear panel 302 as indicated by reference I. In one aspect, the rear input 150 may be positioned somewhere on the rear panel 302 between one or more of input locations A-I.

Figure 4:
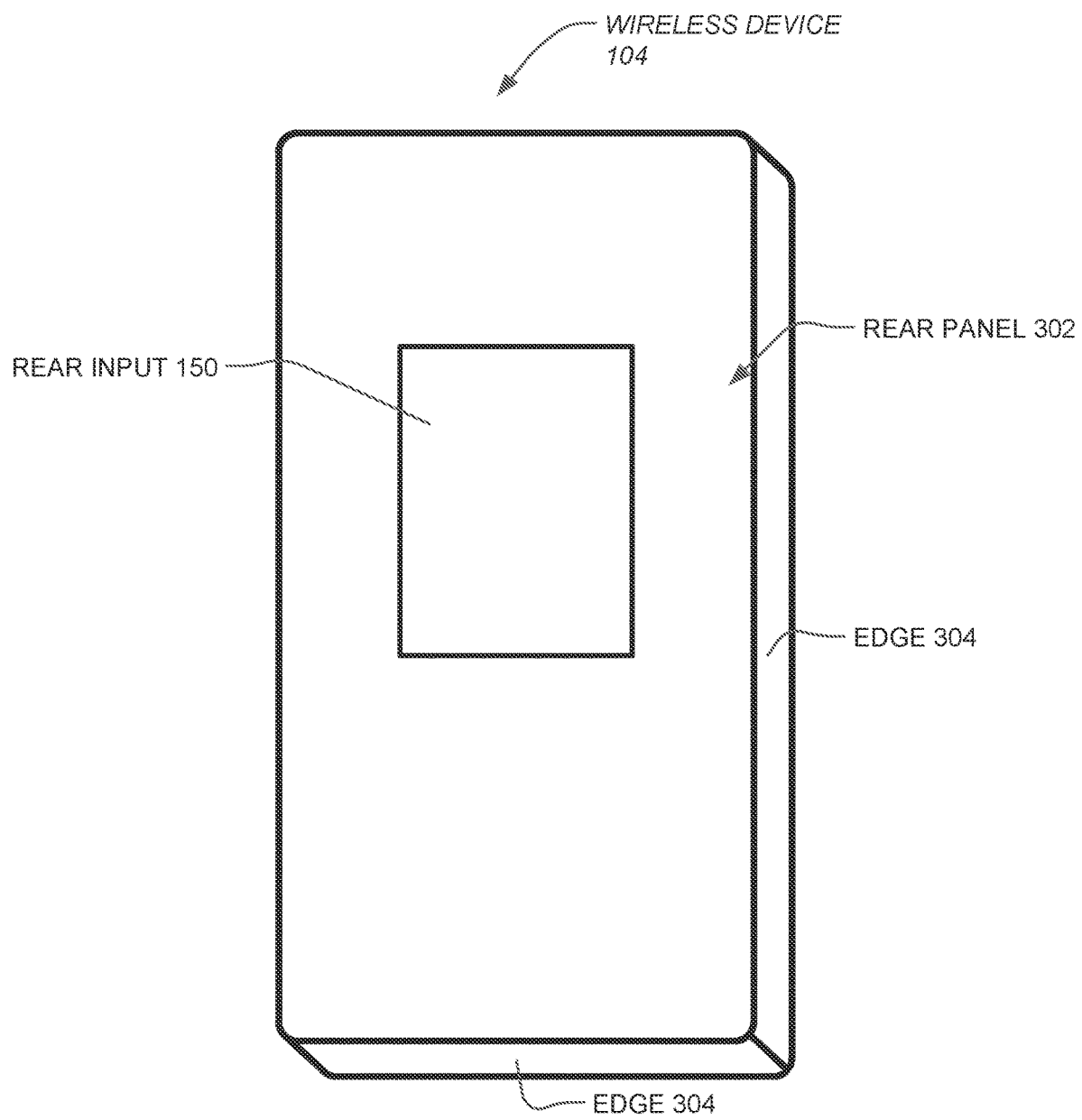
FIG. 4 shows another aspect of a rear panel of the wireless device in accordance with aspects of the disclosure.

FIG. 4 shows another aspect of a rear panel of the wireless device in accordance with aspects of the disclosure. In particular, the aspect shown in FIG. 4 may include a rear input 150 implemented as a touchscreen. The touchscreen type rear input 150 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The touchscreen type rear input 150 may further operate as a trackpad in some aspects. In this regard, the touchscreen type rear input 150 may be configured to sense absolute position. The touchscreen type rear input 150 may be configured to operate as a pointer device with a dragging motion of a finger translated into a finer, relative motion of a cursor or pointer on the graphical user interface 204 of the display 118 by the operating system 148.

The touchscreen type rear input 150 may include associated device driver software that may interpret tapping the touchscreen type rear input 150 as a click, and a tap followed by a continuous pointing motion may indicate dragging. The touchscreen type rear input 150 may allow for clicking and dragging by incorporating button functionality into the surface of the touchscreen type rear input 150. The touchscreen type rear input 150 may include drivers that can also allow the use of multiple fingers.

The touchscreen type rear input 150 may have "hotspots" that may be locations on the touchscreen type rear input 150 used for additional functionality. For example, moving the finger along an edge of the touchscreen type rear input 150 may act as a scroll wheel, controlling the scrollbar and scrolling the window vertically or horizontally.

Figure 5:
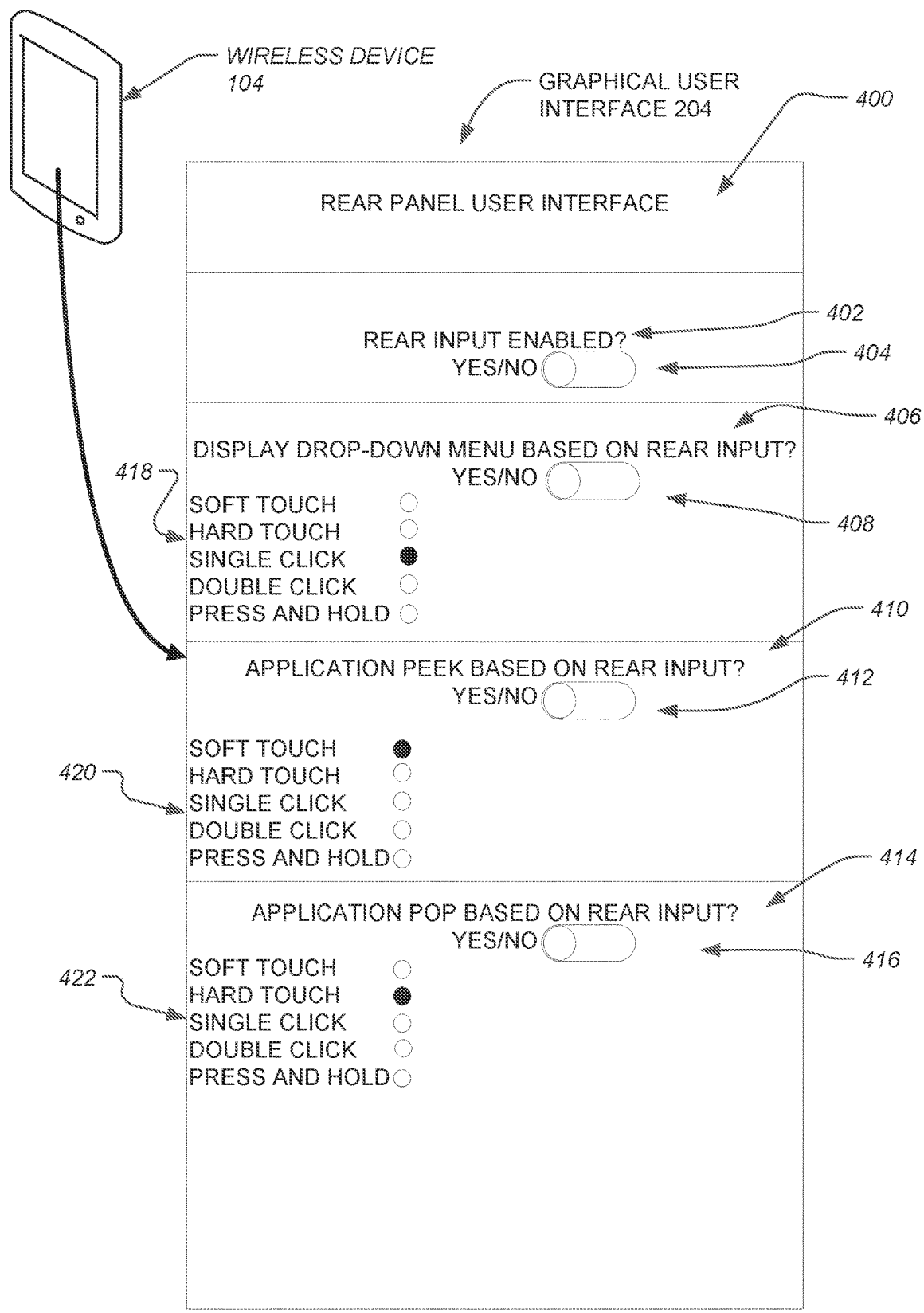
FIG. 5 shows a graphical user interface of the wireless device in accordance with aspects of the disclosure.

FIG. 5 shows a graphical user interface in accordance with aspects of the disclosure. In particular, FIG. 5 shows a rear panel user interface 400 that may be displayed as part of the graphical user interface 204 on the display 118. The rear panel user interface 400 may be implemented in conjunction with the touchscreen 180 to provide interaction and input from a user to customize the rear input 150 as desired by the user. In certain aspects, the rear panel user interface 400 may be implemented as part of the operating system 148, as part of the rear input control application 152, or the like. In certain aspects, the rear panel user interface 400 may be used to define and/or customize the advanced touch screen control.

The rear panel user interface 400 may include enablement functionality 402. A user may then interact with and input using the touchscreen 180 in order to enable the rear input 150 or not. An input part 404 may control the enablement functionality 402 and may be a radio button, a virtual slide switch, or the like. In this regard, when the user enables the rear input 150, thereafter, interacting with the rear input 150 may provide some level of advanced touchscreen control functionality as described herein. As shown in FIG. 5, the enablement functionality 402 has been enabled (YES).

The rear panel user interface 400 may include a drop-down menu enablement functionality 406 as one of the advanced touchscreen controls. A user may then interact with and input using the touchscreen 180 in order to enable the drop-down menu enablement functionality 406 responsive to the rear input 150. An input part 408 may control the drop-down menu enablement functionality 406 and may be a radio button, a virtual slide switch, or the like. In this case, the user may enable the drop-down menu enablement functionality 406 for the rear input 150 as described in greater detail below.

The drop-down menu enablement functionality 406 advanced touch screen control may be further customized to launch the drop-down menu enablement functionality 406 based on a soft touch, hard touch, single click, a double-click, a triple click, a press and hold or similar interaction with the rear input 150. In this regard, the rear panel user interface 400 may include an input section 418 to designate the type of interaction. The input section 418 may be a radio button, a virtual slide switch, or the like. As shown in FIG. 5, the input section 418 has been set for a single click functionality for the rear input 150 to implement the drop-down menu enablement functionality 406.

The drop-down menu enablement functionality 406 may be used to provide additional functionality in the form of a drop-down menu containing additional options. In one aspect, a user can implement the rear input 150 to generate a drop-down menu. In one aspect, a user can implement the rear input 150 to generate a drop-down menu in conjunction with selection of an object in the graphical user interface 204.

The rear panel user interface 400 may include a peek enablement functionality 410 as one of the advanced touch-screen controls. A user may then interact with and input using the touchscreen 180 in order to enable the peek enablement functionality 410 responsive to the rear input 150. An input part 412 may control the peek enablement functionality 410 and may be a radio button, a virtual slide switch, or the like. In this case, the user may enable the peek enablement functionality 410 for the rear input 150 as described in greater detail below. As shown in FIG. 5, the peek enablement functionality 410 has been enabled (YES).

The peek enablement functionality 410 may be further customized to launch the peek enablement functionality 410 based on a soft touch, hard touch, single click, a double-click, a triple click, a press and hold or similar interaction with the rear input 150. In this regard, the rear panel user interface 400 may include an input section 420 to designate the type of interaction. The input section 420 may be a radio button, a virtual slide switch, or the like. As shown in FIG. 5, the input section 420 has been set for a soft touch functionality for the rear input 150 to implement the peek enablement functionality 410.

The peek enablement functionality 410 may be used to provide additional functionality in the form of a peek of content. In one aspect, a user can implement the rear input 150 to generate the peek of content. In one aspect, a user can implement the rear input 150 to generate the peek of content in conjunction with selection of an object or content in the graphical user interface 204. In this regard, the peek enablement functionality 410 may display a preview, known as a peek, with options to act on the peek directly. In other words, the peek functionality may implement the generation of an image of content on the graphical user interface 204 associated with an object or content to which the user is touching. The generation of the image may not be the same as opening the content. Accordingly, the peek functionality may generate the image of content on the graphical user interface 204 more quickly and additionally automatically remove the image once the user is no longer touching the object or content. Moreover, the peek functionality may not allow a user to interact with the object or content. The peek functionality simply provides an image associated with the object or the content. For example, a peek of a photograph object icon would generate an image that is larger than the photograph object icon, but does not allow any action to be applied to the image of the photograph.

The rear panel user interface 400 may include an application pop functionality 414 as one of the advanced touch-screen controls. In this regard, the application pop functionality may load a content or execute an application on the graphical user interface 204 associated with an object or content to which the user is touching. The application pop functionality may allow a user to interact with the object or content. For example, a pop of a photograph object icon would load a photograph into a photograph viewing application and allow actions to be applied to the image of the photograph. Accordingly, a peak is a preview image of content and a pop is a loading and execution of an application associated with the content. A user may then interact with and input using the touchscreen 180 in order to enable the application pop functionality 414 responsive to the rear input 150. An input part 416 may control the application pop functionality 414 and may be a radio button, a virtual slide switch, or the like. In this case, the user may enable the application pop functionality 414 for the rear input 150 as described in greater detail below. As shown in FIG. 5, the application pop functionality 414 has been enabled (YES).

The application pop functionality 414 may be further customized to launch the application pop functionality 414 based on a soft touch, hard touch, single click, a double-click, a triple click, a press and hold or similar interaction with the rear input 150. In this regard, the rear panel user interface 400 may include an input section 422 to designate the type of interaction. The input section 420 may be a radio button, a virtual slide switch, or the like. As shown in FIG.

5, the input section 420 has been set for a hard touch functionality for the rear input 150 to implement the application pop functionality 414.

The application pop functionality 414 may be used to provide additional functionality in the form of an additional action. In one aspect, a user can implement a hard click on the rear input 150 to generate the additional action. In one aspect, a user can implement a hard click on the rear input 150 to generate the additional action in conjunction with selection of an object in the graphical user interface 204.

Additionally, the rear panel user interface 400 may include the ability to provide additional advanced control features equivalent to a PC-based right click reaction, a trackpad functionality, and the like.

Figure 6:
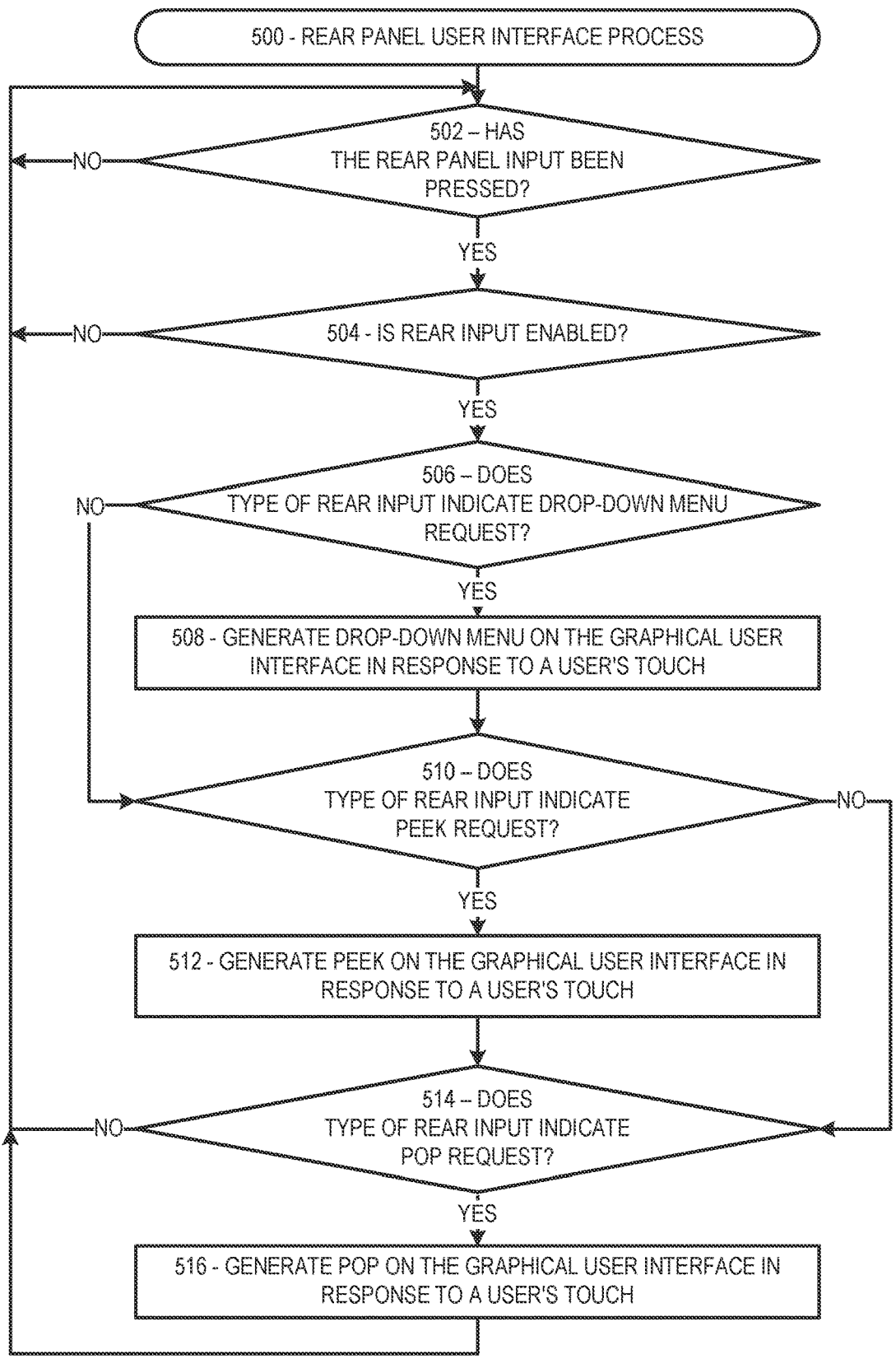
FIG. 6 shows a process of operating the rear input of the wireless device in accordance with aspects of the disclosure.

FIG. 6 shows a process of operating the rear input in accordance with aspects of the disclosure. In this regard, FIG. 6 illustrates a rear panel user interface process 500 for advanced touchscreen control. In certain aspects, the rear panel user interface process 500 may be implemented as part of the operating system 148, as part of the rear input control application 152, or the like.

In box 502, the rear panel user interface process 500 may determine whether the rear input 150 has been pressed to launch advanced touch screen control. In this regard, pressing the rear input 150 may include one or more of a soft click, hard click, single click, a double-click, a triple click, or a press and hold type of interaction for the rear input 150. If no, then the process will simply loop and wait to be interrupted by receiving input from the rear input 150. If yes, the process will move forward to box 504.

In box 504, the rear panel user interface process 500 may determine whether the rear input 150 is enabled. If no, then the process will simply loop. If yes, the process will move forward to box 506.

In box 506, the rear panel user interface process 500 may determine whether the type of rear input indicates a drop-down menu request. If yes, the process will move forward to box 508. If not, the process will move to box 510.

In box 508, the rear panel user interface process 500 may generate a drop-down menu on the graphical user interface 204 in response to a user's touch. The drop-down menu enablement functionality 406 may be used to provide additional functionality in the form of a drop-down menu containing additional options. In one aspect, a user can implement the rear input 150 to generate a drop-down menu. In one aspect, a user can implement the rear input 150 to generate a drop-down menu in conjunction with selection of an object in the graphical user interface 204.

In box 510, the rear panel user interface process 500 may determine whether the type of rear input indicates a peek request. If yes, the process will move forward to box 512. If not, the process will move to box 514.

In box 512, the rear panel user interface process 500 may generate peek on the graphical user interface 204 in response to a user's touch. The peek enablement functionality 410 may be used to provide additional functionality in the form of a peek of content. In one aspect, a user can implement the rear input 150 to generate a peek of content. In one aspect, a user can implement the rear input 150 to generate a peek of content in conjunction with selection of an object in the graphical user interface 204. In this regard, the peek enablement functionality 410 may display a preview, known as a peek, with options to act on the peek directly.

In box 514, the rear panel user interface process 500 may determine whether the type of rear input indicates a pop request. If yes, the process will move forward to box 516. If not, the process will loop back to box 502.

In box 516, the rear panel user interface process 500 may generate a pop on the graphical user interface in response to a user's touch. The application pop functionality 414 may be used to provide additional functionality in the form of an additional action. In one aspect, a user can implement the rear input 150 to generate the additional action. In one aspect, a user can implement the rear input 150 to generate the additional action in conjunction with selection of an object in the graphical user interface 204.

Figure 7:
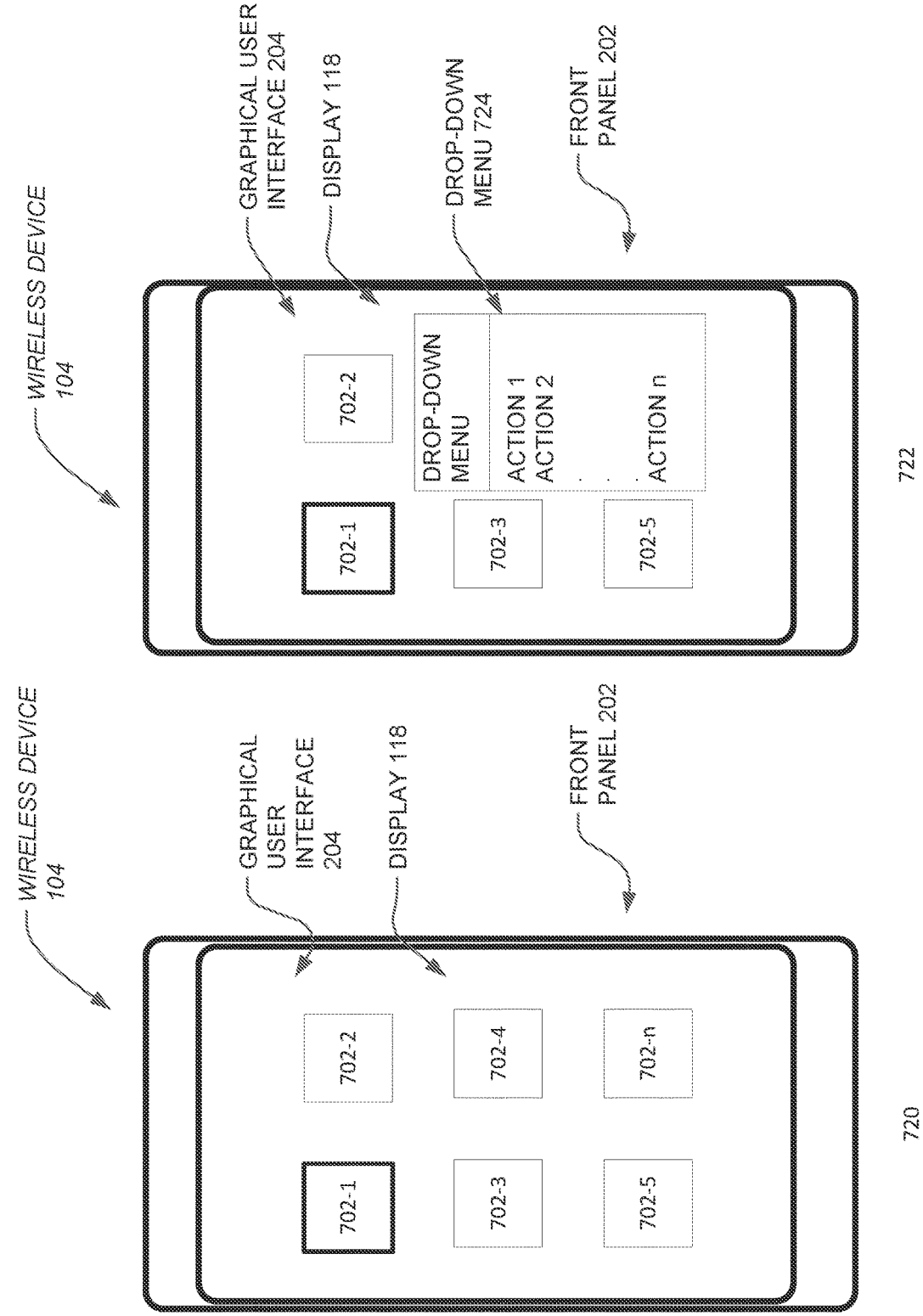
FIG. 7 shows an example of a user interacting with the wireless device in accordance with aspects of the disclosure.

FIG. 7 shows an example of a user interacting with the wireless device in accordance with aspects of the disclosure. In particular, FIG. 7 shows the wireless device 104 implementing a first screen 720 having objects 702-1, 702-2, 702-3, 702-4, 702-5 . . . . 702-n displayed as part of a graphical user interface 204 on the front panel 202 that includes the display 118.

The user may then interact with the rear input 150, for example with the hand holding the wireless device 104, such that the process 500 determines the user desires the drop-down menu enablement functionality 406. In one aspect, a user can implement the rear input 150 to generate a drop-down menu as shown in a second screen 722. In one aspect, a user can implement the rear input 150 to generate the additional action in conjunction with selection of an object in the graphical user interface 204. The drop-down menu enablement functionality 406 may be used to provide additional functionality in the form of a drop-down menu 724 containing additional options in the form of action 1, action 2 . . . action n.

The drop-down menu enablement functionality 406 containing additional options in the form of action 1, action 2 . . . action n may include any number of corresponding actions. The corresponding actions (action 1, action 2 . . . action n) may include any one or more of text cutting, text copying, text pasting, send via text, send via e-mail, font selection, font size selection, style selection, place a call, prepare a text message, change settings of an application, change settings of the wireless device 104, enabling airplane mode for the wireless device 104, disabling airplane mode for the wireless device 104, connect the wireless device 104 to a wireless fidelity network, enabling Bluetooth for the wireless device 104, modifying display settings for the wireless device 104, modifying wallpaper of the graphical user interface 204, modifying sounds generated by for the wireless device 104, setting privacy for the wireless device 104, posting social media content, adding an event to a calendar application, and the like.

The drop-down menu enablement functionality 406 containing additional options in the form of action 1, action 2 . . . action n may include any number of corresponding actions that are responses to the user tapping an object 702-1 such as an application. In this regard, a user can implement a single click on the rear input 150 and touch an object, such as object 702-1 to generate a drop-down menu specifically for the object 702-1.

Figure 8:
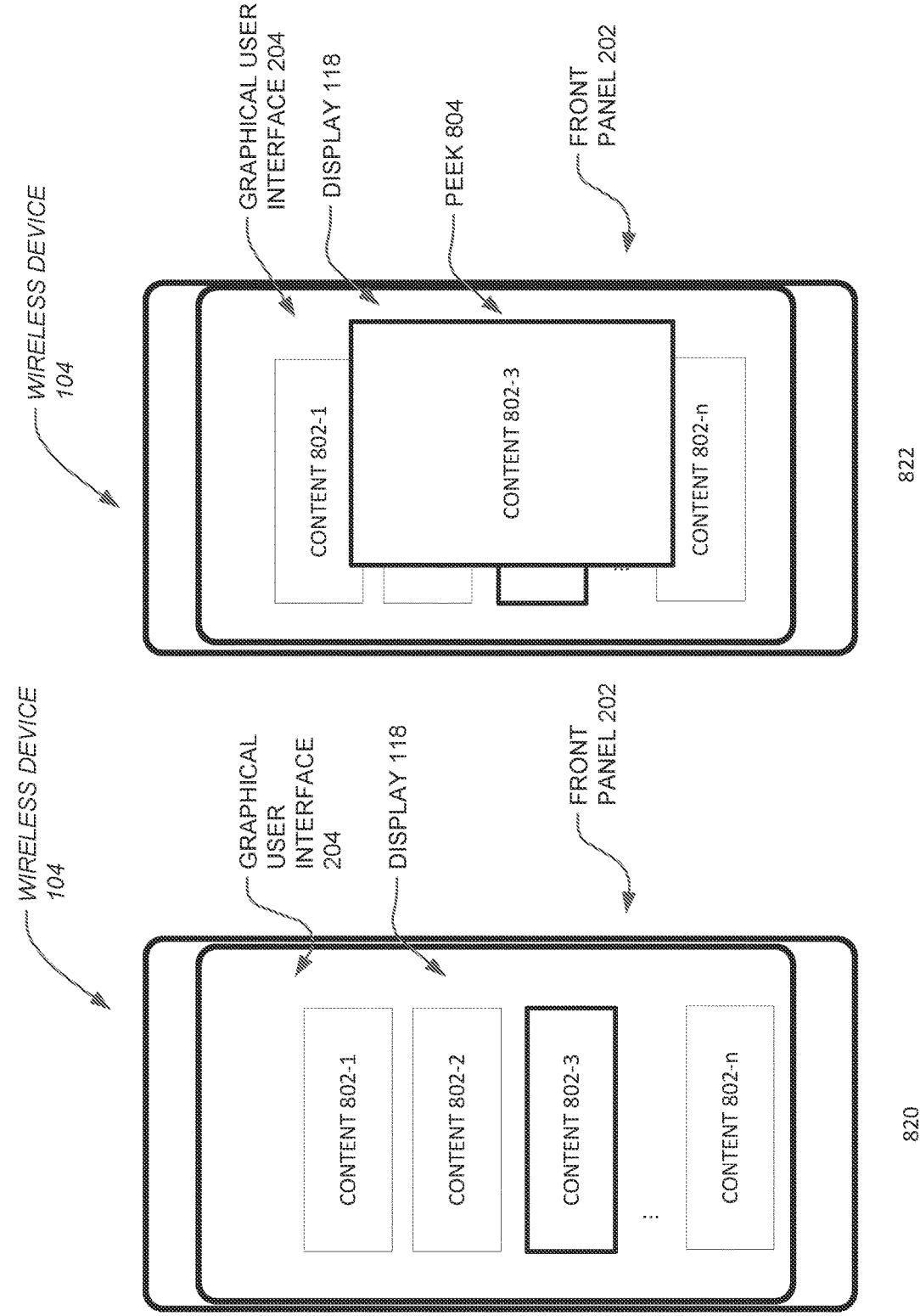
FIG. 8 shows another example of a user interacting with the wireless device in accordance with aspects of the disclosure.

FIG. 8 shows an example of a user interacting with the wireless device in accordance with aspects of the disclosure. In particular, FIG. 8 shows the wireless device 104 implementing a first screen 820 having content 802-1, content 802-2, content 802-3, . . . content 802-n displayed as part of a graphical user interface 204 on the front panel 202 that includes the display 118.

The user may then interact with the rear input 150, for example with the hand holding the wireless device 104, such that the process 500 determines the user desires the peek enablement functionality 410. For example, a user can implement a soft touch on the rear input 150 to generate a peek 804 as shown in a second screen 822. The peek enablement functionality 410 may be used to provide additional functionality in the form of a peek of content. In this regard, the peek enablement functionality 410 may display a preview, known as a peek, with options to act on the peek directly.

The peek enablement functionality 410 may be used to provide additional functionality in the form of a peek of one of content 802-1, content 802-2, content 802-3, . . . content 802-n displayed as part of a graphical user interface 204 on the front panel 202 that includes the display 118. As shown in the second screen 822, the user has pressed the rear input 150 and subsequently touched content 802-3 to generate a peek 804 of the content 802-3. The peek 804 may be a pop-up box showing a preview of an e-mail message, a preview of a photograph, a preview of a webpage, a preview of information on a contact, a zoomed in image of the content, a preview of a social media feature, and the like.

Figure 9:
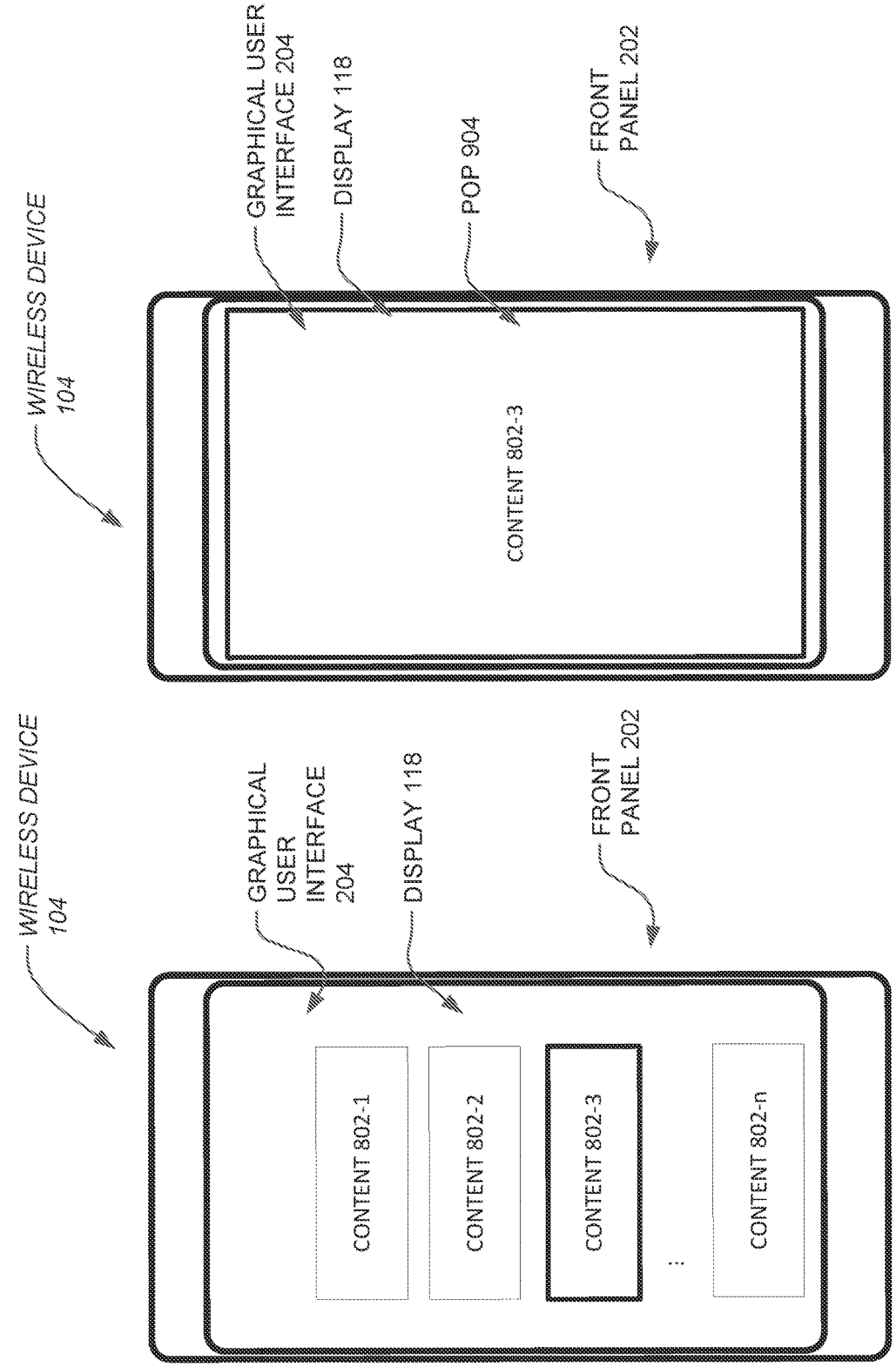
FIG. 9 shows another example of a user interacting with the wireless device in accordance with aspects of the disclosure.

FIG. 9 shows an example of a user interacting with the wireless device in accordance with aspects of the disclosure. In particular, FIG. 9 shows the wireless device 104 implementing a first screen 920 having content 802-1, content 802-2, content 802-3, . . . content 802-n displayed as part of a graphical user interface 204 on the front panel 202 that includes the display 118.

The user may then interact with the rear input 150, for example with the hand holding the wireless device 104, such that the process 500 determines the user desires the application pop functionality 414. For example, a user can implement a hard touch on the rear input 150 to generate a pop 904 as shown in screen 922. The application pop functionality 414 may be used to provide additional functionality in the form of a pop action for content 802-1.

The application pop functionality 414 may be used to provide additional functionality in the form of a pop of one of content 802-1, content 802-2, content 802-3, . . . content 802-n displayed as part of a graphical user interface 204 on the front panel 202 that includes the display 118. As shown in the screen 922, the user has pressed the rear input 150 and subsequently touched content 802-3 to generate a pop 904 of the content 802-3. The pop 904 may be may include any one or more of send via text, send via e-mail, place a call, prepare a text message, change settings of an application, change settings of the wireless device 104, enabling airplane mode for the wireless device 104, disabling airplane mode for the wireless device 104, connect the wireless device 104 to a wireless fidelity network, enabling Bluetooth for the wireless device 104, modifying display settings for the wireless device 104, modifying wallpaper of the graphical user interface 204, modifying sounds generated by for the wireless device 104, setting privacy for the wireless device 104, posting social media content, adding an event to a calendar application, launching a map and driving direction application utilizing a global navigation satellite system (GNSS) and the like.

Figure 10:
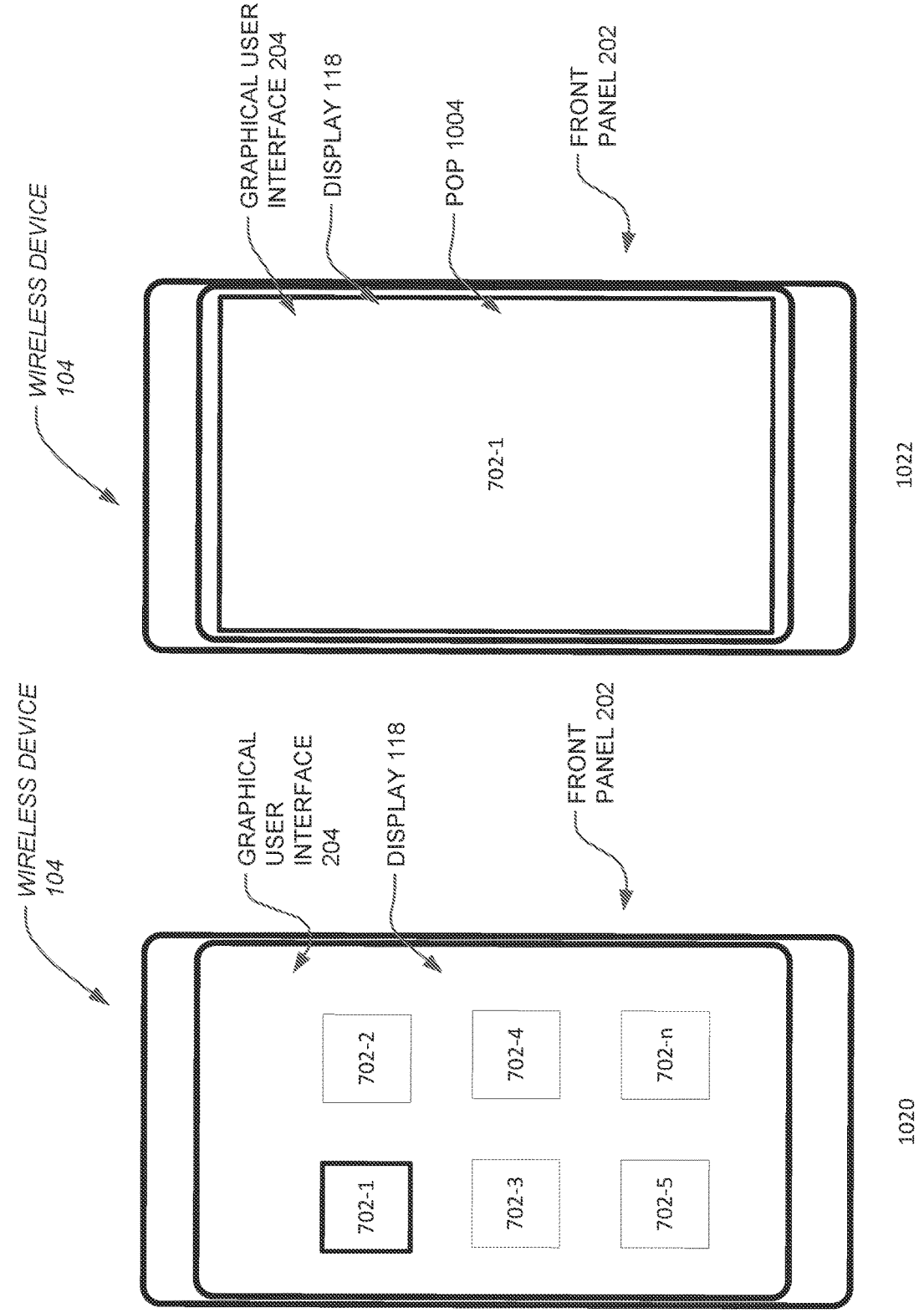
FIG. 10 shows another example of a user interacting with the wireless device in accordance with aspects of the disclosure.

FIG. 10 shows an example of a user interacting with the wireless device in accordance with aspects of the disclosure. In particular, FIG. 10 shows the wireless device 104 implementing a first screen 1020 having objects 702-1, 702-2, 702-3, 702-4, 702-5 . . . . 702-n displayed as part of a graphical user interface 204 on the front panel 202 that includes the display 118.

The user may then interact with the rear input 150, for example with the hand holding the wireless device 104, such that the process 500 determines the user desires the application pop functionality 414. For example, a user can implement a hard touch on the rear input 150 to generate a pop 1004 as shown in screen 1022. The application pop functionality 414 may be used to provide additional functionality in the form of a pop action for object 702-1.

In some aspects, the drop-down menu enablement functionality 406, the peek enablement functionality 410, and/or the application pop functionality 414, may be configured to provide menu, peek or pop functionality regarding recent conversations, live video, photos, contacts, and web links, some of which can be swiped up for more options in communication applications. In some aspects, the drop-down menu enablement functionality 406, the peek enablement functionality 410, and/or the application pop functionality 414, may be configured to provide menu, peek or pop functionality regarding conversations, links, photos, videos, contact cards, and locations inside for instant messaging applications.

In some aspects, the drop-down menu enablement functionality 406, the peek enablement functionality 410, and/or the application pop functionality 414, may be configured to provide menu, peek or pop functionality regarding events and reminders for calendar applications.

In some aspects, the drop-down menu enablement functionality 406, the peek enablement functionality 410, and/or the application pop functionality 414, may be configured to provide menu, peek or pop functionality regarding a restaurant to preview its location on a map and upcoming reservations that are available for restaurant based applications.

In some aspects, the drop-down menu enablement functionality 406, the peek enablement functionality 410, and/or the application pop functionality 414, may be configured to provide menu, peek or pop functionality regarding ticket information and pricing for event ticket purchasing applications.

In some aspects, the drop-down menu enablement functionality 406, the peek enablement functionality 410, and/or the application pop functionality 414, may be configured to provide menu, peek or pop functionality regarding recent notes, as well as links and locations inside them for notes applications.

In some aspects, the drop-down menu enablement functionality 406, the peek enablement functionality 410, and/or the application pop functionality 414, may be configured to provide menu, peek or pop functionality regarding individual items on to-do lists to quickly set or alter a reminder for calendar applications.

Moreover, other applications are contemplated to provide advanced touch control such as the drop-down menu enablement functionality 406, the peek enablement functionality 410, and/or the application pop functionality 414.

Accordingly, the disclosure has provided a wireless device and process that provides a user with the ability to provide advanced input, execution and other interaction with the wireless device by a user that is less expensive, less complex, easier to manufacture, and less difficult for a user to utilize. Moreover, the disclosure has presented a wireless device and process that provides a user with the ability to provide advanced user control, execution and other interaction with the wireless device by a user while the user is holding the wireless device with one hand.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Further in accordance with various aspects of the disclosure, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless device comprising:
   a housing including a front panel, a rear panel, and side edges, the front panel arranged in a front side of the housing and the front panel being associated with a display device configured to display a graphical user interface, the rear panel arranged on a rear side of the housing, and the side edges being arranged between the rear panel and the front panel;
   a processor configured to execute instructions stored in a memory;
   a rear touchscreen input arranged in the rear panel configured to receive a user input on the rear side;
   a touchscreen associated with the display device and the touchscreen configured to receive a user input on the front panel;
   the rear touchscreen input arranged on the rear panel of the housing configured to receive a user input in conjunction with the processor to provide advanced user controls on the graphical user interface displayed on the front panel;
   the display device in response at least in part to the processor being further configured to display a rear touchscreen input customization user interface on the graphical user interface to request a user's designation, the rear touchscreen input customization user interface displays graphical user interface elements to request enablement functionality of the rear touchscreen input to enable the rear touchscreen input and a plurality of enablement functionalities of advanced user controls to enable the advanced user controls on the graphical user interface of the front panel, each of the advanced user controls being configured to receive a user's designation of a different type of user input applied to the rear touchscreen input for a corresponding type of one of the advanced user controls and thereafter set the user's designation of the different type of user input of the rear touchscreen input to the corresponding type of one of the advanced user controls; and the processor configured to display a corresponding type of one of the advanced user controls on the graphical user interface displayed on the display device to provide additional functionality as a part of the graphical user interface in response to receiving a type of user input applied to the rear touchscreen input that has been set for the corresponding type of one of the advanced user controls, wherein the advanced user controls comprise at least a user menu functionality that is generated by the processor and displayed on the graphical user interface to provide the user menu with a plurality of possible actions for the user to choose for implementing one of the plurality of possible actions;

wherein the type of user input applying to the rear input for each of the plurality of enablement functionalities of advanced user controls comprises at least a soft touch, a hard touch, a single click, a double-click, and a press and hold;

wherein the wireless device comprises at least one of a wireless phone, a mobile phone, user equipment, a tablet computer, and a smartphone; and wherein the wireless device further comprises a transceiver configured to connect to a wireless network over a communication channel.

2. The wireless device according to claim 1 wherein:
the advanced user controls further comprise at least one of the following: a content peek functionality, a pop functionality, and a trackpad functionality; and
the processor is further configured to implement one of the plurality of possible actions in response to the user selecting one of the plurality of possible actions from the user menu displayed on the graphical user interface.

3. The wireless device according to claim 2 wherein:
the advanced user controls comprise the content peek functionality generated by the processor and displayed on the graphical user interface to provide a peek of content in response to the user touching one of the following: one of a plurality of contents on the graphical user interface and one of a plurality of objects on the graphical user interface; and
the content peek functionality providing an image associated with the content without opening the content.

4. The wireless device according to claim 2 wherein the advanced user controls comprise the pop functionality generated by the processor and the graphical user interface to provide an execution in response to the user touching one of the following: one of a plurality of contents on the graphical user interface and one of a plurality of objects on the graphical user interface.

5. The wireless device according to claim 2 wherein the advanced user controls comprise the trackpad functionality generated by the processor and the processor further configured to provide the trackpad functionality on the graphical user interface in response to the user touching the rear touchscreen input.

6. The wireless device according to claim 5 wherein the trackpad functionality generated by the processor is configured to implement gesture input for the user touching the rear touchscreen input.

7. The wireless device according to claim 5 wherein the trackpad functionality generated by the processor is configured to implement cursor control and/or pointer control on the graphical user interface in response to the user touching the rear touchscreen input.

8. The wireless device according to claim 2 wherein:
the processor is further configured to implement one of the plurality of possible actions in response to the user selecting one of the plurality of possible actions from the user menu displayed on the graphical user interface;
the advanced user controls further comprise the content peek functionality generated by the processor and displayed on the graphical user interface to provide a peek of content in response to the user touching one of the following: one of a plurality of contents on the graphical user interface and one of a plurality of objects on the graphical user interface;
the content peek functionality providing an image associated with the content without opening the content; and
the advanced user controls further comprise the pop functionality generated by the processor and the graphical user interface to provide an execution in response to the user touching one of the following: one of the plurality of contents on the graphical user interface and one of the plurality of objects on the graphical user interface.

9. The wireless device according to claim 1 further comprising:
a button arranged on the rear panel in a position to be actuated by the user when the user is holding the housing in their hand with the front panel facing the user; and
the button is recessed into the rear panel of the housing.

10. The wireless device according to claim 1 wherein the processor is further configured to receive the user input to modify an operation of the processor in response to receiving an input from the rear touchscreen input.

11. A process to implement a wireless device comprising:
configuring a housing to include a front panel, a rear panel, and side edges, the front panel arranged in a front side of the housing and the front panel being associated with a display device configured to display a graphical user interface, the rear panel arranged on a rear side of the housing, and the side edges being arranged between the rear panel and the front panel;
arranging a rear touchscreen input on the rear panel of the housing and the rear touchscreen input configured to receive a user input;
arranging a touchscreen associated with the display device of the front panel and the touchscreen configured to receive a user input;
configuring a processor to execute instructions stored in a memory;
receiving a user input applied to the rear touchscreen input on the rear panel of the housing, by the processor, and providing advanced user controls on the graphical user interface displayed on the front panel;

generating on the display device, by the processor, display of a rear touchscreen input customization user interface on the graphical user interface to request a user's designation, the rear touchscreen input customization user interface displays graphical user interface elements to request enablement functionality of the rear touchscreen input to enable the rear touchscreen input and a plurality of enablement functionalities of advanced user controls to enable the advanced user controls on the graphical user interface, each of the advanced user controls being configured to receive a user's designation of a different type of user input applying to the rear touchscreen input for a corresponding type of one of the advanced user controls and thereafter set the user's designation of the different type of user input of the rear touchscreen input to the corresponding type of one of the advanced user controls; and displaying a corresponding type of one of the advanced user controls on the graphical user interface displayed on the front panel to provide additional functionality as a part of the graphical user interface with the processor in response to receiving a type of user input applied to the rear touchscreen input that has been set for the corresponding type of one of the advanced user controls, wherein the advanced user controls comprise at least a user menu functionality that is generated by the processor and displayed on the graphical user interface to provide the user menu with a plurality of possible actions for the user to choose for implementing one of the plurality of possible actions;

wherein the type of user input applying to the rear input for each of the plurality of enablement functionalities of advanced user controls comprises at least a soft touch, a hard touch, a single click, a double-click, and a press and hold;

wherein the wireless device comprises at least one of a wireless phone, a mobile phone, user equipment, a tablet computer, and a smartphone; and wherein the wireless device further comprises a transceiver configured to connect to a wireless network over a communication channel.

12. The process according to claim 11 wherein:
the advanced user controls further comprise at least one of the following: a content peek functionality, a pop functionality, and a trackpad functionality; and
the process further comprising implementing one of the plurality of possible actions in response to the user selecting one of the plurality of possible actions from the user menu displayed on the graphical user interface.

13. The process according to claim 12 wherein the trackpad functionality generated by the processor is configured to implement gesture input for the user touching the rear touchscreen input.

14. The process according to claim 12 wherein the trackpad functionality generated by the processor is configured to implement cursor control and/or pointer control on the graphical user interface in response to the user touching the rear touchscreen input.

15. The process according to claim 12 wherein:
the advanced user controls comprise the content peek functionality and further comprising generating by the processor and displaying on the graphical user interface a peek of content in response to the user touching one of the following: one of a plurality of contents on the graphical user interface and one of a plurality of objects on the graphical user interface; and
the content peek functionality providing an image associated with the content without opening the content.

16. The process according to claim 15
wherein the advanced user controls further comprise the content peek functionality and further comprising generating by the processor and displaying on the graphical user interface a peek of content in response to the user touching one of the following: one of a plurality of contents on the graphical user interface and one of a plurality of objects on the graphical user interface; and
wherein the advanced user controls further comprise the pop functionality and further comprising generating by the processor and the graphical user interface an execution in response to the user touching one of the following: one of the plurality of contents on the graphical user interface and one of the plurality of objects on the graphical user interface.

17. The process according to claim 12 wherein the advanced user controls comprise the pop functionality and further comprising generating by the processor and the graphical user interface an execution in response to the user touching one of the following: a plurality of contents on the graphical user interface and a plurality of objects on the graphical user interface.

18. The process according to claim 12 wherein the advanced user controls comprise the trackpad functionality and further comprising generating by the processor the trackpad functionality on the graphical user interface in response to the user touching the rear touchscreen input.

19. The process according to claim 11 wherein:
the rear touchscreen input further comprises a button arranged on the rear panel in a position to be actuated by the user when the user is holding the housing in their hand with the front panel facing the user; and
the button is recessed into the rear panel of the housing.

20. The process according to claim 11 further comprising receiving the user input to modify an operation of the processor in response to receiving an input from the rear touchscreen input.

* * * * *